United States Patent [19]
Opmeer

[11] 3,815,549
[45] June 11, 1974

[54] SPLIT LEVEL BIRD CAGE

[76] Inventor: Arthur Opmeer, 2112 Zion Rd., Grand Junction, Colo. 81501

[22] Filed: Apr. 19, 1973

[21] Appl. No.: 352,517

[52] U.S. Cl. ............................................. 119/17
[51] Int. Cl. ........................................ A01k 31/00
[58] Field of Search ............................. 119/17, 18

[56] References Cited
UNITED STATES PATENTS
| | | | |
|---|---|---|---|
| 146,249 | 1/1874 | Grover | 119/17 |
| 2,120,262 | 6/1938 | Rodess | 119/17 |
| 2,611,338 | 9/1952 | Yellin | 119/17 |

FOREIGN PATENTS OR APPLICATIONS
| | | | |
|---|---|---|---|
| 106,926 | 6/1917 | Great Britain | 119/17 |

*Primary Examiner*—Hugh R. Chamblee
*Attorney, Agent, or Firm*—Richard D. Law

[57] ABSTRACT

A bird cage is provided comprising an upper wire cage assembly, a lower base section and an intermediate or coupling section. The open ends of the upper and lower section telescope into the coupling section to form a single enclosed bird cage. The coupling section is provided with a slot for insertion of a separator which closes off the interior of the coupling section forming two separate compartments within the cage. By isolating the birds in one compartment, the opposite compartment may be separated from the cage and cleaned as desired. Covered water and seed cups are centrally located on the floor surface of the bottom section.

7 Claims, 5 Drawing Figures

PATENTED JUN 11 1974 3,815,549

SPLIT LEVEL BIRD CAGE

This invention is directed to a bird cage which can be divided into two separate compartments. It is more specifically directed to a bird cage having separate sections which can be closed by an intermediate section for the purpose of separating one section so that portions of the cage may be cleaned as desired.

As is common with most bird cages, in order to periodically clean the cage, it is necessary to capture the bird or birds and place them in a separate cage or area while performing the cleaning process. Thus, it can be a relatively exasperating experience to perform the relatively simple cage cleaning operation. In addition, any time the cleaning operation is performed, there exists the possibility that the bird or birds will be injured or accidentally set free.

Many of the present cages provide a slidable tray or drawer in the bottom of the cage for removing the floor surface for cleaning the debris collected thereon. This can be a messy operation in that the seed hulls and debris are easily spilled if the tray is tipped or not carefully handled. Also, the corners and bottom side areas of the cage accumulate debris which are still inaccessible and difficult to reach for cleaning.

An object of the present invention is to provide a cage which can be separated into compartments for retaining the birds safely and securely while the opposite portion of the cage is cleaned or maintained.

Another object of the present invention is to provide a bird cage which is easily separated into compartments for ease in shipping or transporting and later assembly by unskilled persons.

A still further object of the present invention is to provide a bird cage which can be easily cleaned and maintained and provides ready accessibility to the lower portion of the cage which accumulates most of the soil and debris. This cage can thus provide a more hygienic environment to reduce the exposure of the birds to disease and sickness.

Another object of the present invention is to provide a bird cage wherein seed and water receptacles are centrally located in the lower regions of the cage to prevent their contents from being scattered or spilled outside of the confined area of the cage.

Another object of the present invention is to provide a split level or divisible type bird cage which is extremely easy and economical to manufacture.

The bird cage of the present invention is provided in a split level arrangement having an upper section and a bottom or base section which are coupled together by an intermediate section. Each of the sections merely slide together in a telescoping fashion to form a single enclosed bird cage. A slotted guideway is provided within the coupling section to receive a separator tray or plate member which can be inserted into the guideway to divide or separate the bird cage into two separate compartments. Thus, the birds can be trapped in one section or the other while the opposite section may be removed for cleaning or rearrangement. Thus, an extremely easy method is provided for securing birds while maintaining the cleanliness of the cage.

Protected seed cups and water receptacles are provided centrally located on the floor of the base section of the cage. These containers can be of a large size to provide a sufficient supply to allow extended periods of time between replenishment for such purposes as vacations. The large water receptacle can also double as a bird bath. A covered hand opening may be provided in the side of the lower section so that the seed cups and water receptacles may be replenished as desired without disturbing the rest of the cage. This hand opening is covered by a slidable sheet member which is arranged in a slotted bracket mounted on the side of the lower section.

The bird cage, according to this invention, can be fabricated from any type of desirable materials, such as metals or plastics. It would be preferable to fabricate the upper cage portion from thin wire members, as is usual in this type of construction. The lower or base section can be molded as a one piece unit from fiberglass, plexiglas or plastic, preferably with the bottom corners rounded to prevent the collection of debris and to make the cleaning operation much more easy. It is preferable that the base section, or at least a portion thereof, be fabricated from a transparent material to permit visual observation of the bird, especially when confined in that section. The intermediate section can be fabricated from any suitable material, such as metal, wood or plastics, which can provide a rigid support for the cage sections and a closure means for separating the compartments of the cage.

Other features of this invention will appear in the following description and appended claims, reference being made to the accompanying drawings forming a part of the specification wherein like reference characters designate corresponding parts in the several views.

Figure 1:
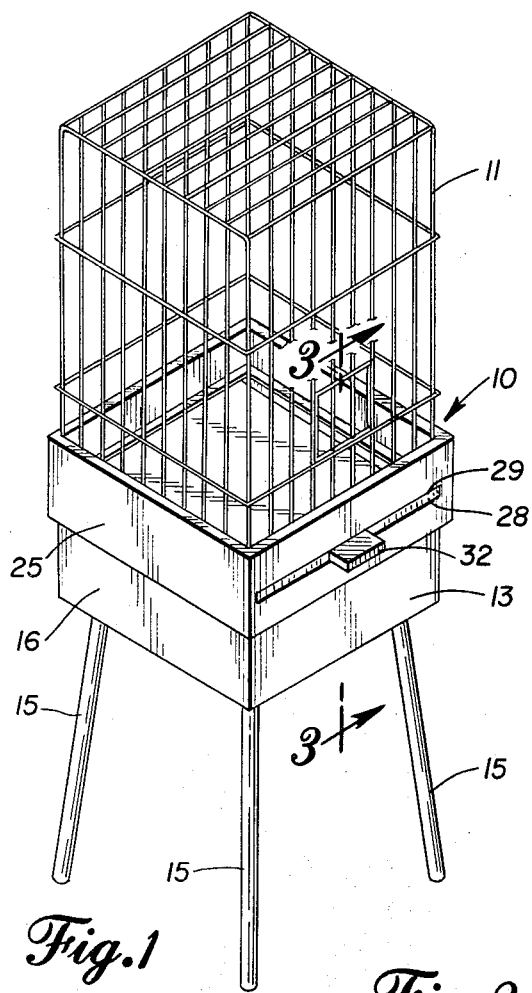
FIG. 1 is an isometric view of the bird cage according to this invention in the assembled condition.
Figure 2:
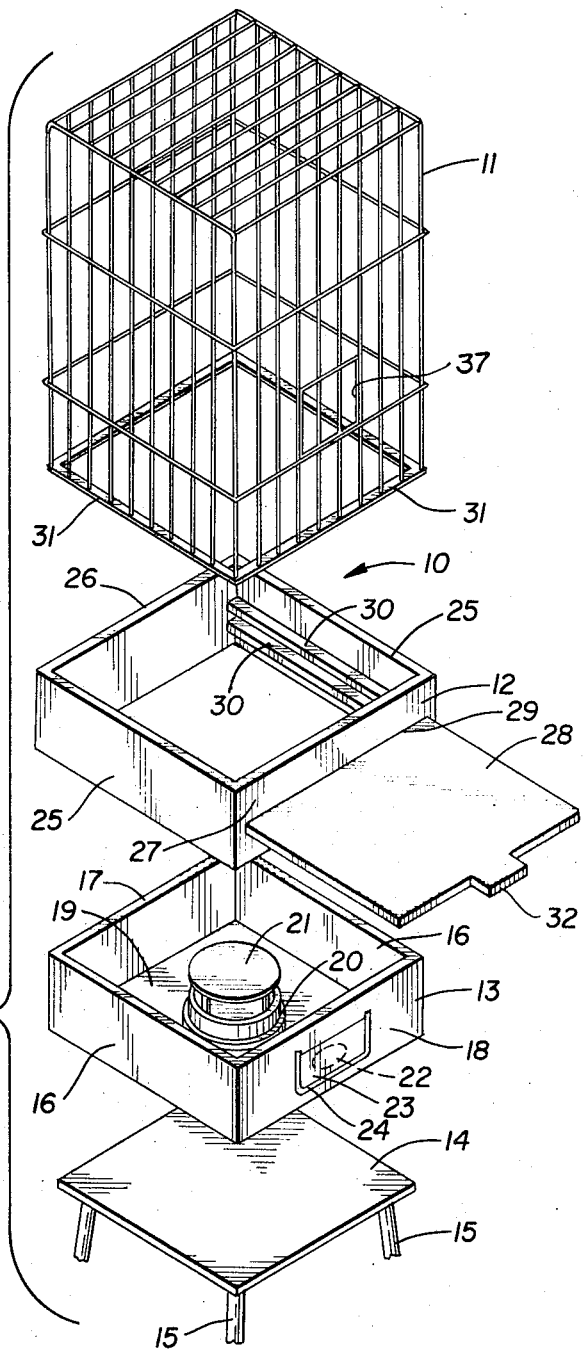
FIG. 2 is an exploded view of the various sections of the cage showing their relative position.
Figure 3:
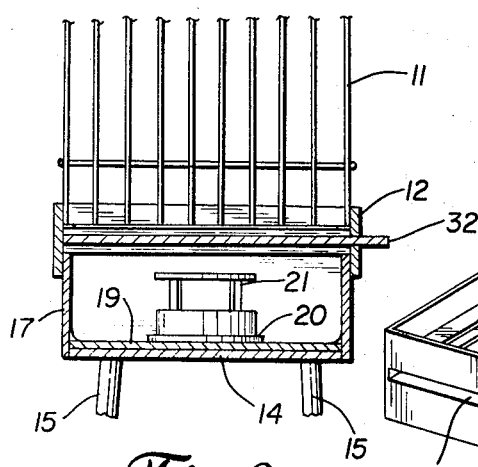
FIG. 3 is a partial cross sectional view of the cage taken along the lines 3—3 of FIG. 1, showing the separator member inserted within the intermediate section.

Turning now more specifically to the drawings, FIGS. 1 and 2 show the bird cage assembly 10 of the present invention which is comprised of an upper cage assembly 11, intermediate or coupling section 12 and base section 13. Although the cage assembly 10 may be supported on a shelf, table or the like, a separate support stand 14, having legs 15 of suitable length to support the cage at the desired height, may be provided. The top of the support stand 14 may be arranged to fit around the outer perimeter of the base section 13 or a recessed area formed within the underportion of the base section 13. In this way, the cage 10 is prevented from slipping from the base support stand 14, thus forming a rigid and secure support.

The base section 13 includes side walls 16, rear wall 17 and front wall 18. A bottom wall or floor 19 is provided. A centrally located circular ridge is provided in the central portion of the bottom wall 19 to retain relatively large covered seed and water cups for the birds. A hand access hole 22 may be provided in one wall, such as the front wall 18, to provide easy access to the water and feed cups for the purpose of replenishing the supply therein. A flat plastic sheet 23, slidably mounted in guide 24, is positioned in front of the hand opening 22. To prevent the seeds and water from being spilled outside of the cage, the base section 13 may have a height of approximately one-fourth or one-third of the total height of the cage assembly 10.

The intermediate or coupling section 12 is composed of side walls 25, rear wall 26 and front wall 27. An elongated, rectangular slot 29 extends the full width of the front wall 27 and permits passage of the separator 28 therethrough. A convenient handle or tab 32 is provided along the front edge of the separator 28. A pair of elongated guide members 30 are provided on the inside surface of each of the side walls 25. The guide members 30 are arranged parallel to the upper and lower surfaces of the coupling section 12 and are spaced a sufficient width to permit passage of the separator plate 28. If desired, the guide members 30 may be formed as one-piece grooved members. In this fashion, the separator plate 28 may be inserted into the slot 29 and along the guide members 30 so as to completely seal or close off the inner area of the coupling section 12, as shown in FIG. 1.

The upper cage section 11, formed from open spaced wires or mesh, is enclosed on the sides and top with the bottom allowed to remain open. An access door 37, which can be either slidable on or hinged to the wires at the front of the cage, is provided. A frame member 31 is provided at the bottom edge of the side walls of the cage assembly 11 and provides rigidity and strength for the open end of the cage.

In assembling the bird cage, the top cage section telescopes into the upper portion of the coupling section so that the frame member 31 rests on the top surfaces of the guide members 30. In the same fashion, the coupling section fits down over the upper surfaces of the base section so that the upper edges of the side walls 16 support the coupling section along the lower surfaces of the guide members 30. The sections of the bird cage 10 thus are sized to slidably interfit each other so that the sections can be freely inserted and removed, yet provide a close fit to prevent escape of the birds contained therein. If desired, retainer devices such as springs can be attached along the opposite outer surfaces of the cage between the base section 13 and cage section 11 to prevent accidental separation of the sections. In use, depending upon whether the upper cage section or the bottom base section is to be removed for cleaning, the birds are moved to the opposite section and the separator 28 is inserted into the coupling section to retain the birds in the desired side. The coupling section is retained with the section in which the birds are located while the opposite section is removed.

Figure 4:
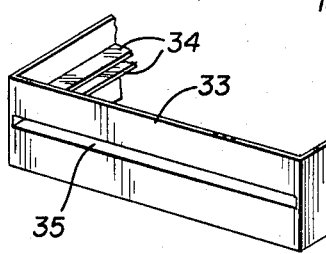
FIG. 4 shows an isometric view of another embodiment showing construction of the intermediate section of the bird cage.

In another embodiment of the coupling section 12 of the cage assembly 10, the walls of the section 12 can be formed from angled members having a vertical wall 33 and inwardly extending spaced parallel lips 34. The front wall has a slot 35, as shown in FIG. 4, to permit passage of the separator 28 while the other three walls 33 would be solid. In this way, the section 12 can be molded as a one-piece, integral unit formed from any moldable material such as plastic.

Figure 5:
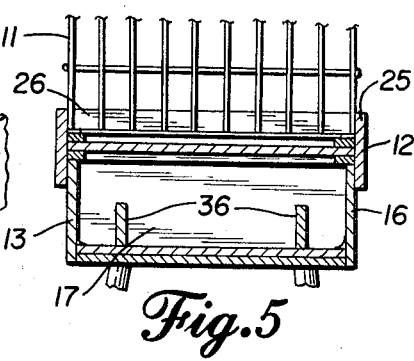
FIG. 5 shows a partial, cross sectional view of another embodiment of the cage showing upstanding side members for retaining separate seed and water containers.

Another embodiment of the seed cup arrangement is shown in FIG. 5, wherein the base member 13 includes dividers 36 which are so arranged to extend upwardly from the floor surface 19 and spaced parallel from the side members 16. In this way, the seed cups and water receptacles can be suspended from the dividers 36 or positioned in the space between the dividers 36 and the side walls 16 of the base member.

While a split level bird cage has been shown and described in detail, it is obvious that this invention is not to be considered as being limited to the exact form disclosed, and that changes in detail and construction may be made therein within the scope of the invention without departing from the spirit thereof.

Having thus set forth and disclosed the nature of this invention, what is claimed is:

1. A cage assembly for retaining at least one bird or animal, said cage assembly comprising:
    a. an upper enclosed cage section open at its lower end,
    b. a lower enclosed cage section open at its upper end and having a cross sectional configuration identical to the upper cage section, said lower section having a bottom floor surface and means on said floor surface for supporting seed and water cups for feeding the bird to be contained within the cage,
    c. a coupling section having an inner configuration corresponding to the sides of the upper and lower cage sections and arranged to be disposed between said sections, said coupling section includes side walls forming a closed perimeter and open through the center portion, an elongated transverse slot extends horizontally across a portion of said side walls and guide means is arranged along the inside surface of said side walls aligned with said transverse slot,
    d. said coupling section being sized to permit the slidable insertion of the open end of said lower section and said upper cage section to form the enclosed cage assembly, and
    e. said coupling section includes a flat separator means arranged to be slidably inserted into said transverse slot and said guide means, said separator member being sized to close off the internal opening of said coupling section whereby said cage assembly can be internally divided to retain the bird in either the upper section or the lower section so that the opposite section may be removed for cleaning.

2. A cage assembly as defined in claim 1 wherein said lower cage section includes a hand access opening in a side wall and closure means for securing said access opening.

3. A cage assembly as defined in claim 1 wherein said seed and water cup supporting means is provided as a circular ridge centrally located on the floor surface of said lower cage section for retaining the said cups in their proper location.

4. A cage assembly as defined in claim 1 wherein said seed and water cup means is provided as a pair of upstanding parallel members arranged on each side of the floor surface of said lower cage section for supporting and retaining said seed cups.

5. A cage assembly as defined in claim 1 wherein said coupling section is formed as a single one-piece molded unit.

6. A cage assembly as defined in claim 1, wherein:
    the outer cross-sectional configuration of said cage sections form a rectangle having four side walls;
    the transverse slot of said coupling section extends across the width of one sidewall and the guide means is arranged along at least the opposite side walls which intersect said slotted side wall; and the upper and lower cage sections inserted within said coupling section abut opposite sides of said guide means.

7. A cage assembly as defined in claim 1 wherein the outer configuration of said assembly forms a cylinder having a circular side wall, said coupling section slot extends around one-half of the circumference of the side wall of said section and the guide means extends around at least the remaining portion of the circumference of said side wall, and the upper and lower cage section inserted within said coupling section abut opposite sides of said guide means.

* * * * *